United States Patent [19]
Takahashi et al.

[11] 3,988,119
[45] Oct. 26, 1976

[54] PISTON RING

[75] Inventors: Kentaro Takahashi, Ohmiya; Yoshikatsu Nakamura, Yokohama, both of Japan

[73] Assignee: Nippon Piston Ring Co., Ltd., Tokyo, Japan

[22] Filed: Jan. 2, 1975

[21] Appl. No.: 538,215

Related U.S. Application Data

[63] Continuation-in-part of Ser. No. 332,446, Feb. 14, 1973, abandoned.

[30] Foreign Application Priority Data
Feb. 14, 1972 Japan................................ 47-14829

[52] U.S. Cl.............................. 29/195; 277/235 A; 29/196.1; 29/198
[51] Int. Cl.² .......................................... B32B 15/18
[58] Field of Search............. 29/195 M, 196.1, 198; 277/235, 235 A

[56] References Cited
UNITED STATES PATENTS

| | | | |
|---|---|---|---|
| 2,311,240 | 2/1943 | Marien et al. .................. | 277/235 A |
| 3,560,006 | 2/1971 | Watanabe ...................... | 277/235 A |
| 3,690,686 | 9/1972 | Prasse ............................ | 277/235 A |
| 3,749,559 | 7/1973 | Prasse ............................ | 29/191.2 |

*Primary Examiner*—L. Dewayne Rutledge
*Assistant Examiner*—E. L. Weise
*Attorney, Agent, or Firm*—Sughrue, Rothwell, Mion, Zinn and Macpeak

[57] ABSTRACT

An abrasion and scuff resistant piston ring having an outer peripheral surface formed by the simultaneous spray deposition of from 30 to 95% of molten molybdenum and from 5 to 70% of molten iron alloy.

6 Claims, 3 Drawing Figures

PISTON RING

This is a continuation-in-part of application Ser. No. 332,446, filed Feb. 14, 1973, now abandoned.

BACKGROUND OF THE INVENTION

Field of the Invention

This invention relates to piston rings which are for use in internal combustion engines and which have good resistance to friction and wear. Recently, the compression ratio and the revolution speed of internal combustion engines have been considerably increased in order to provide more efficient engine performance. Accordingly, the piston rings used in internal combustion engines are required to have greater wear resistance, so as to withstand the severe conditions of the environment in which they must operate effectively. The degree of wear resistance of piston rings depends upon a number of factors including their ability to resist abrasion, i.e., the grinding abrasive action imparted by solid particles of high hardness, and their ability to resist scuffing. Therefore, in order to enhance the effective wear resistance of piston rings for use in modern internal combustion engines, it as been desirable to improve both the abrasion resistance and the scuffing resistance of such piston rings.

Discussion of Prior Art

Heretofore, various piston rings have been known which provide enhanced wear resistance. Such piston rings include those which are chrome plated on their sliding surfaces (hereafter referred to as chrome plated piston rings). Piston rings having a coating of molybdenum deposited on their sliding surfaces have also been known (hereafter referred to as molybdenum deposited piston rings).

The chrome plated piston rings have proved to be unsatisfactory, however, due to the fact that chrome plating is an expensive operation and also due to the fact that the resulting piston rings do not exhibit a sufficiently high degree of scuff resistance. Similarly, the molybdenum deposited piston rings also have failed to attain extensive commercial usage because of high cost and poor abrasion resistance.

Consequently, neither the chrome plated piston rings or the molybdenum deposited piston rings have been widely accepted because they are incapable of providing a sufficiently high degree of resistance to both abrasion and scuffing, which are necessary properties if the piston rings are to have good wear resistance.

SUMMARY OF THE INVENTION

The present invention overcomes the above-mentioned problems of the prior art by providing piston rings having satisfactory resistance to both abrasion and scuffing action. Briefly stated, there is provided in accordance with this invention a piston ring provided on its outer peripheral surface with a deposit of a composite alloy which imparts excellent wear resistance to the piston ring. The deposited composite alloy which is coated on the outer peripheral surface of the piston ring is formed by the simultaneous spraying of from about 30 to 95% of molten molybdenum and from about 5 to 70% of a molten iron alloy. The resulting coating comprises iron alloy, molybdenum, combinations of iron alloy and molybdenum and voids.

DETAILED DESCRIPTION OF THE INVENTION

Figure 1:
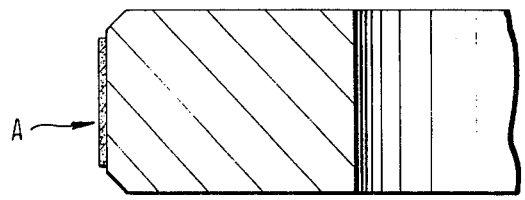
FIGS. 1 and 2 are cross-sectional views of piston rings having spray deposited layers in accordance with this invention.

In accordance with this invention piston rings of improved wear resistance are produced by depositing on the outer peripheral surface of a piston ring a coating formed by the simultaneous spraying of from 30 to 95% of molten polybdenum and from 5 to 70% of molten iron alloy to produce a surface resistant to both abrasion and scuffing, the surface comprising iron alloy, molybdenum, combinations of the iron alloy and molybdenum and voids.

If less than about 30% of molybdenum is employed, the piston ring does not have the requisite hardness. On the other hand, if more than 95% of molybdenum is deposited a substantial reduction in overall physical strength of the deposited layer is experienced, with consequent impairment of abrasion resistance.

If less than 5% of the iron alloy is deposited, the physical strength of the deposited layer is reduced, as is the abrasion resistance. A deposit containing more than 70% of the iron alloy does not provide the correlated effect of a proper mixing of iron and molybdenum which results in inherently improved abrasion and scuff resistance in the piston rings.

In accordance with the invention, one of the most advantageous features of the piston ring is the firm bonding between the metallic particles in the deposited coating and the underlying piston ring structure, so that separation of high hardness solid particles from the deposited coating by frictional and sliding contact with the mating member during operation of the piston ring is minimized. Consequently abrasion of the mating member caused by the separated particles is also minimized and a piston ring of greatly improved abrasion resistance is obtained.

By contrast, piston rings of the prior art which include a deposited molybdenum layer normally exhibit extremely low tensile strength, on the order of 450 kg/cm$^2$, which is believed to represent poor or loose bonding between these solid metal particles in the deposited layer, thus leading to poor abrasion resistance.

In the present invention, the presence of particles of the high temperature iron alloy in the molten metal which forms the deposition layer also facilitates firm bonding of the layer to the underlying piston ring structure and improves alloying of the molybdenum particles and iron alloy particles during formation of the deposition coating. This results in a rigidly bonded unitary structure including the difficulty bonded molybdenum particles securely supported and bound by the alloy combination of iron alloy and molybdenum. See FIG. 3 of the drawing wherein the molybdenum particles are represented by numeral 1 and the alloy combination of iron alloy and molybdenum is represented by numeral 2.

Figure 3:
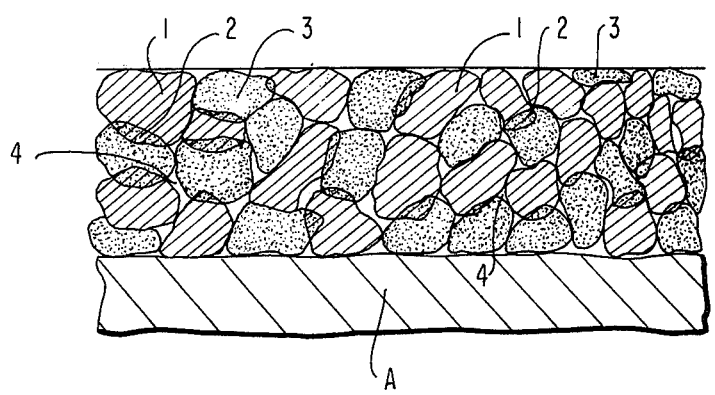
FIG. 3 is an enlarged fragmentary cross-sectional view of a portion of a piston ring provided with a spray deposited coating in accordance with the invention.

In the structure illustrated in FIG. 3, the iron alloy particles are designated by reference numeral 3, the voids by reference numeral 4 and the matrix by reference A.

The entire deposited coating thus provides an improved and more rigid bonding strength (tensile strength) and better abrasion resistance, than the prior art piston rings.

The deposition coating of the present invention also provides a superior lubrication characteristic due to the voids (FIG. 3, reference 4) which serve to retain a lubricant between the material particles in the deposition layer. This function is also found in the prior art piston rings having a molybdenum deposition layer. In addition to the above, the composite alloy deposition coating on the piston ring of the present invention consists of the iron alloy, the combination of iron alloy and molybdenum, the molybdenum particles and the voids and includes shallow recesses which are formed on the iron alloy particles due to the difference in hardness of the iron alloy particles and the molybdenum particles and the consequent different wearing effect imposed on the iron alloy particles and the molybdenum particles.

The scuffing resistance of the piston rings of the present invention is further enhanced by the presence of an antifriction iron oxide film formed on a portion of the surface of the iron alloy particles during the formation of the deposition coating. The iron oxide film has an extremely low coefficient of friction which results in improved scuff resistance. Similarly, molybdenum oxide is formed on the molybdenum particles which provides an additional benefit in terms of scuff resistance.

From the foregoing, it should be readily apparent that an improved piston ring has been described which includes a deposited composite alloy coating formed by spraying a molten material containing from 30 to 95% molybdenum and from 5 to 70% iron alloy so as to cover the sliding surfaces of a piston ring. The thus formed deposited composite alloy coating consists of iron alloy particles, particles of a combination of iron alloy and molybdenum, molybdenum particles and voids and provides improved resistance to abrasion and scuffing due to the inherent properties and characteristics of the individual particle components and by the correlation of the particles of the various materials in the deposition coating.

In forming the piston ring of the present invention various carbon steels may be used, such as 13 chrome stainless steel. It is believed to be essential, however, that the iron alloy which is selected should be one such that the entire deposited coating exhibits a hardness above HRC 25. Iron alloys giving a hardness value in the deposited layer lower than HRC 25 should be avoided.

The production of piston rings in accordance with the present invention is set forth in the following examples.

EXAMPLES 1–9

Coatings of molten metal deposition layers were applied to normal cast iron test pieces for piston rings on the outer peripheral surfaces. The coatings were 0.3 mm thick and the test pieces had the following compositions:

Test Piece Composition

|  | % |
|---|---|
| Total carbon | 3.5 |
| Silicon | 2.6 |
| Manganese | 0.6 |
| Iron | Balance |

These layers were formed by simultaneously spraying molten molybdenum and molten iron alloy under the following conditions:

Spraying gun; Meteco 3K Type spraying gun
$O_2$ gas pressure; 30 lb/in$^2$
$O_2$ gas flow rate; 2.57 m$^3$/hr
$C_2H_2$ gas pressure; 15 lb/in$^2$
$C_2H_2$ gas flow rate; 1.57 m$^3$/hr
Air pressure; 45 lb/in$^2$
Air flow rate; 32.6 m$^3$/hr The iron alloys applied in each respective example had the following compositions:

| Component | C | Si | Mn | Ni | MO | Cr | Fe |
|---|---|---|---|---|---|---|---|
| No. 1 & 5 | 0.7 | 0.2 | 0.7 | 2.0 | 0.3 | 1.0 | Balance |
| No. 2 & 7 | 0.8 | 0.2 | 0.7 | — | 0.3 | 1.2 | Balance |
| No. 3 | 0.8 | 0.2 | 0.7 | — | — | — | Balance |
| No. 4 | 0.8 | 0.2 | 0.7 | — | — | 1.2 | Balance |
| No. 6 | 0.3 | 0.2 | 0.6 | — | — | 1.3 | Balance |
| No. 8 | 0.3 | 0.2 | 0.8 | — | — | — | Balance |

After application of the deposition layers, the test pieces were tested on a rotary disc tester composed of an alloy of 2.9% total carbon, 2.2% silicon; 0.6% manganese and 94.3% of gray cast iron under the following conditions:
Rotary tester speed — 5 m/sec.
Friction load — 25 Kg/cm$^2$
Lubricant temperature — 80° C
Amount of lubricant — 0.6 l/hour

| Lubricant- | Daphne oil No. 65 | 50% |
|---|---|---|
|  | Kerosene | 50% |

Duration of test 5 hours

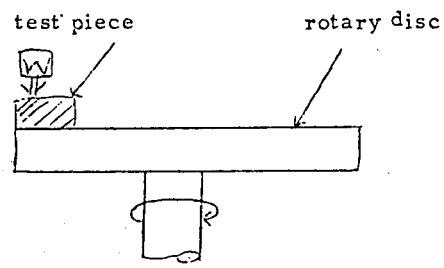

The following results were thus obtained in the tests:

| No. | 1 | 2 | 3 | 4 | 5 | 6 | 7 | 8 | 9 (Prior Art) |
|---|---|---|---|---|---|---|---|---|---|
| Iron alloy (%) | 5 | 10 | 20 | 30 | 40 | 50 | 60 | 70 | Molybdenum 100 |
| Molybdenum (%) | 95 | 90 | 80 | 70 | 60 | 50 | 40 | 30 | |
| Rockwell C-scale | 40 | 40 | 40 | 40 | 40 | 40 | 40 | 37 | 40 |
| Tensile strength (Kg/cm$^2$) | 1000 | 1300 | 1820 | 1900 | 2000 | 1950 | 2000 | 2000 | 450 |
| Amount of wearing out ($\mu$) | 3.2 | 2.4 | 0.8 | 0.8 | 1.0 | 1.4 | 2.2 | 4.0 | 4.4 |

Figure 2:
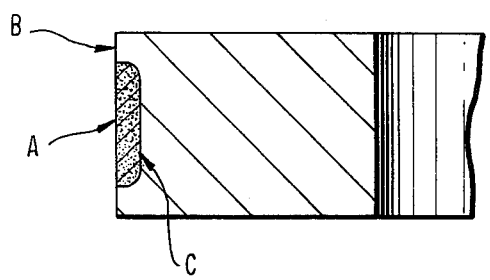

Each of these deposition layers may be deposited on the outer peripheral surface of a piston ring as shown in cross-sectional views in FIGS. 1 and 2.

While the description has been made in conjunction with a composite alloy deposition layer, it should be noted that such composite alloy deposition coating covers all normal modifications such as might contain additional rigid oxide, nitride, carbide, silicide, sulfide and fluoride elements.

While the invention has been particularly shown and described with reference to preferred embodiments thereof, it will be understood by those skilled in the art that various changes in form and details may be made therein without departing from the spirit and scope of the invention.

What is claimed is:

1. A piston ring having improved abrasion and scuff resistance comprising:
    a metal piston ring body, and
    a layer on said body which is the solidified deposit resulting from the simultaneous application onto a wear surface of said piston ring body of molten molybdenum and molten iron alloy wherein said molybdenum and said iron alloy are applied in approximately equal amounts,
    said iron alloy being selected so that the said layer exhibits a hardness value of at least about HRC 25,
    said layer consisting of a mixture of particles of said iron alloy, an alloy of said iron alloy and molybdenum, and molybdenum, surface portions of said layer being oxidized to iron oxide and molybdenum oxide, and said layer further containing voids.

2. The piston ring of claim 1, wherein said iron alloy is a carbon steel containing about 0.8% carbon.

3. The piston ring of claim 1, wherein said iron alloy is a 13 chrome stainless steel.

4. A piston ring having improved abrasion and scuff resistance comprising:
    a metal piston ring body, and
    a layer on said body which is the solidified deposit resulting from the simultaneous application onto a wear surface of said piston ring body of molten molybdenum and molten iron alloy wherein said molten molybdenum is present in an amount of about 80% and said iron alloy in an amount of about 20%,
    said iron alloy being selected so that the layer exhibits a hardness value of at least about HRC 25,
    said layer consisting of a mixture of particles of said iron alloy, an alloy of said iron alloy and molybdenum, and molybdenum, surface portions of said layer being oxidized to iron oxide and molybdenum oxide and said layer further containing voids.

5. The piston ring of claim 4, wherein said iron alloy is a carbon steel containing about 0.8% carbon.

6. The piston ring of claim 4, wherein said iron alloy is a 13 chrome stainless steel.

* * * * *